(12) United States Patent
Bertez et al.

(10) Patent No.: US 6,521,864 B2
(45) Date of Patent: Feb. 18, 2003

(54) METHOD AND APPARATUS FOR THE LASER CUTTING OF MILD STEEL OR STRUCTURAL STEEL WITH A MULTIFOCUS OPTICAL COMPONENT

(75) Inventors: Christophe Bertez, Vaureal (FR); Jean Hamy, Montigny Les Cormeille (FR); Olivier Matile, Paris (FR)

(73) Assignee: L'Air Liquide Societe Anonyme a Directoire et Conseil de Surveillance pour l'Etude et L'Exploitatiion des Procedes Georges Claude, Paris (FR)

(*) Notice: Subject to any disclaimer, the term of this patent is extended or adjusted under 35 U.S.C. 154(b) by 0 days.

(21) Appl. No.: 09/755,051

(22) Filed: Jan. 8, 2001

(65) Prior Publication Data

US 2001/0019044 A1 Sep. 6, 2001

(30) Foreign Application Priority Data

Jan. 10, 2000 (FR) ............................................. 00 00230

(51) Int. Cl.$^7$ ............................................... B23K 26/00
(52) U.S. Cl. .............................. 219/121.72; 219/121.67; 219/121.85
(58) Field of Search ....................... 219/121.72, 121.67, 219/121.85, 121.6

(56) References Cited

U.S. PATENT DOCUMENTS

| | | | | |
|---|---|---|---|---|
| 3,749,878 A | * | 7/1973 | Sullivan et al. ................ | 219/69 |
| 4,461,947 A | * | 7/1984 | Ward ..................... | 219/121 FS |
| 4,467,171 A | * | 8/1984 | Ramos .................. | 219/121 LG |
| 4,781,907 A | * | 11/1988 | McNeill ...................... | 423/351 |
| 4,952,770 A | * | 8/1990 | Hayashi ................. | 219/121.67 |
| 5,227,606 A | * | 7/1993 | Weeks et al. .......... | 219/121.67 |
| 5,578,228 A | * | 11/1996 | Beyer et al. ........... | 219/121.72 |
| 6,316,743 B1 | * | 11/2001 | Nagahori et al. ...... | 219/121.67 |

FOREIGN PATENT DOCUMENTS

| | | |
|---|---|---|
| DE | 27 13 904 | 10/1978 |
| DE | 40 34 745 | 7/1991 |
| JP | 56-122690 | 9/1981 |
| JP | 01-048692 | 2/1989 |
| WO | WO 98/14302 | 4/1998 |

* cited by examiner

Primary Examiner—M. Alexandra Elve
(74) Attorney, Agent, or Firm—Young & Thompson

(57) ABSTRACT

Method and apparatus for cutting a workpiece made of structural steel or mild steel, i.e. alloy or non-alloy steels, by the use of a transparent or reflecting optical unit for focusing a laser beam, and of an assist gas for the laser beam. The optical unit is of the multifocus type and is chosen from lenses, mirrors and combinations thereof. The assist gas is nitrogen or a nitrogen/oxygen mixture. The method of the invention makes it possible to obtain a low or almost zero oxidation of the cut face and to do so while increasing the cutting performance by about 40% compared with a laser cutting method using nitrogen or a nitrogen/oxygen mixture.

12 Claims, 2 Drawing Sheets

METHOD AND APPARATUS FOR THE LASER CUTTING OF MILD STEEL OR STRUCTURAL STEEL WITH A MULTIFOCUS OPTICAL COMPONENT

FIELD OF THE INVENTION

The present invention relates to a method and an apparatus for cutting structural steels or mild steels by a laser beam, using at least one lens or at least one bifocal mirror, in order to focus the laser beam at at least two focusing points separate from one another and lying on the same axis, and nitrogen or a nitrogen/oxygen mixture as assist gas for the laser beam.

BACKGROUND OF THE INVENTION

Structural steels or mild steels encompass alloy or non-alloy steels, whether these are ferritic or austenitic, especially so-called low-alloy steels containing less than about 5% of alloying elements and those so-called high-alloy steels containing more than 5% of alloying elements.

At the present time alloy or non-alloy steels are currently cut by laser beam using oxygen as assist gas, also called cutting gas.

This is because the use of oxygen makes it possible, because of the chemical reaction of iron in the presence of oxygen, to obtain high cutting rates combined with reduced cutting gas flow rates, which means that low-cost cut workpieces are obtained.

However, the use of oxygen as assist gas for a laser beam poses a major problem, namely the problem of oxidation of the cut faces.

This is because it is known that, when cutting alloy or non-alloy steels with a laser beam, the oxygen generates an oxide film on the cut face which prevents the adhesion to it of protective elements, such as paint for example.

In order to obtain better adhesion of such protective elements, a subsequent brushing operation is then required in order to remove this oxide layer.

However, such a post-treatment operation on the cut face or faces considerably increases the cost of the workpiece, this being the more so the more complex the profile of the latter.

Consequently, in order to avoid or minimize this oxidation problem and although oxygen is the most suitable gas for cutting by a laser beam in terms of performance, it has already been proposed to cut steels using nitrogen or a nitrogen/oxygen mixture.

The fact of using nitrogen or a nitrogen/oxygen mixture does indeed make it possible to reduce the oxygen content in the assist gas and therefore the presence of oxides on the cut faces of the workpiece thus cut.

However, with nitrogen or a nitrogen/oxygen mixture, the cutting rates are considerably limited and the gas consumption is increased compared with oxygen.

The use of nitrogen or a nitrogen/oxygen mixture instead of oxygen is therefore not ideal as it results in a reduction in the performance of the laser cutting method.

SUMMARY OF THE INVENTION

Consequently, the object of the present invention is to improve the methods of cutting alloy or non-alloy steels by a laser beam, that is to say to provide a method of laser cutting a steel workpiece resulting in little, or indeed almost zero, oxidation of the cut faces by increasing the cutting performance by about 40% compared with a laser cutting method using nitrogen or a nitrogen/oxygen mixture.

The present invention therefore relates to a method of cutting a workpiece made of alloy or non-alloy steel by the use of at least one transparent or reflecting optical means for focusing at least one laser beam and of at least one assist gas for said laser beam, in which the optical means is of the multifocus type and the assist gas is nitrogen or a nitrogen/oxygen mixture containing at least 90% nitrogen.

In the case of the present invention, the expression "optical means of the multifocus type" is understood to mean that the optical means, for example a lens, makes it possible to focus the laser beam at several focusing points separated from one another, usually a first and a second separate focusing point, which points generally lie on an axis approximately coaxial with the axis of the nozzle of the laser device, that is to say of the laser head via which the laser beam or beams emanate.

Depending on the case, the method of the invention may comprise one or more of the following characteristics:

- the optical means is chosen from lenses, mirrors and combinations thereof, preferably a lens, for example a bifocal lens, that is to say one having two separate focusing points;
- the assist gas is nitrogen containing less than 150 ppm by volume of oxygen as impurities, preferably less than 100 ppm by volume;
- the assist gas is a nitrogen/oxygen mixture having an oxygen content greater than 0% by volume and less than 8% by volume, preferably between 150 ppm by volume and 5% by volume;
- the optical means is arranged so as to obtain at least one first focusing point, being positioned near the upper surface of the workpiece to be cut, preferably so as to coincide with said upper surface, or in the thickness of the workpiece to be cut in a region close to said upper surface, and at least one second focusing point, being positioned near the lower surface of the workpiece to be cut and in the thickness of the latter, or beyond the latter;
- the thickness of the workpiece to be cut is between 1.5 mm and 5 mm and, for these thicknesses, a laser source of 1 800 watts in power is then used, for example;
- the workpiece to be cut is chosen from plates, sheets and tubes;
- the nitrogen/oxygen mixture is obtained directly on the site of use from atmospheric air treated by a membrane system.

DETAILED DESCRIPTION OF THE INVENTION

Figure 1:
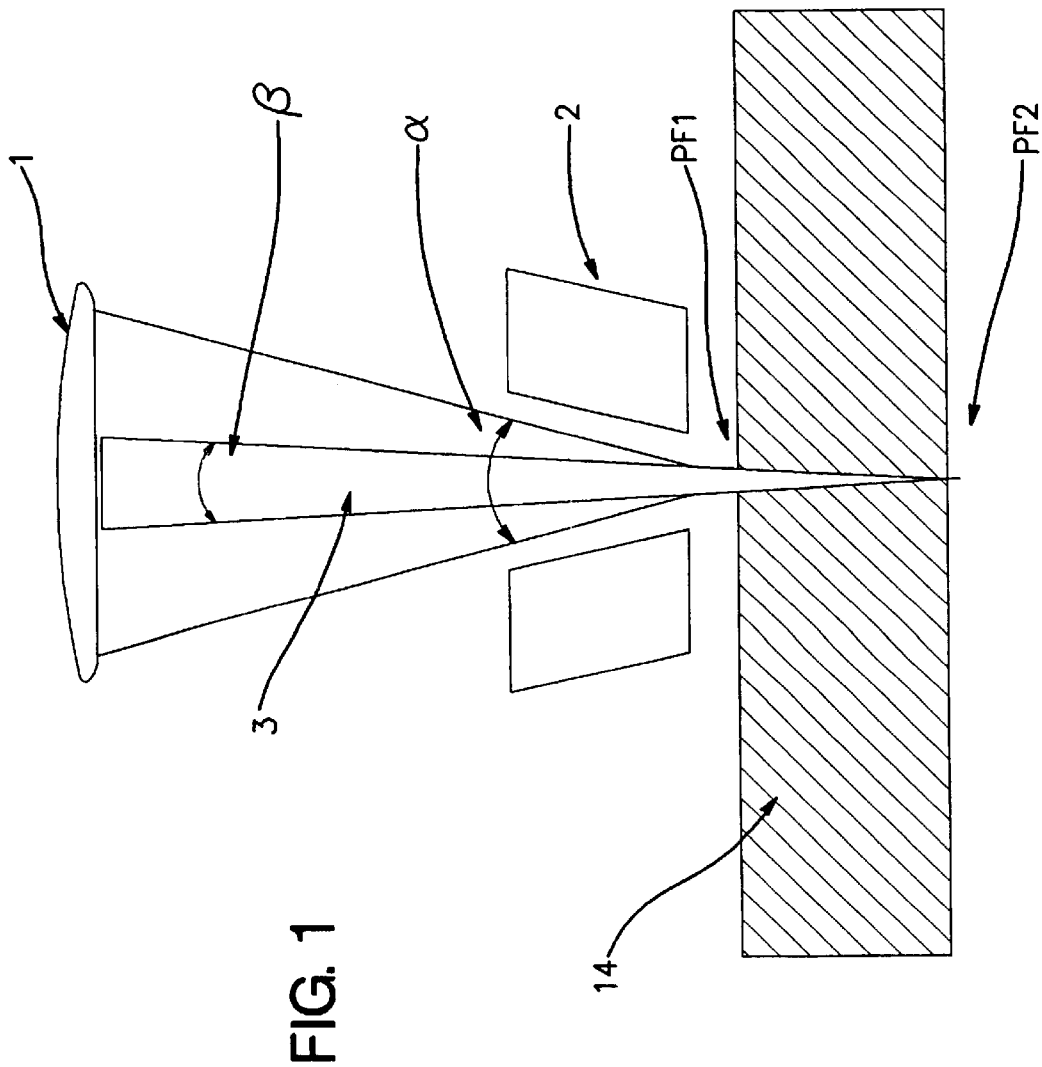
FIG. 1 is a schematic representation of a multifocus optical component used in the present invention.

In other words, as shown schematically in FIG. 1, the invention relies on the use, in combination, on the one hand, of one or more transparent or reflecting optical components 1, such as lenses or mirrors, making it possible to obtain several separate focusing points PF1, PF2 for the laser beam 3, approximately along the same axis and, on the other hand, of nitrogen or of a nitrogen/oxygen mixture as assist gas, that is to say cutting gas.

Figure 2:
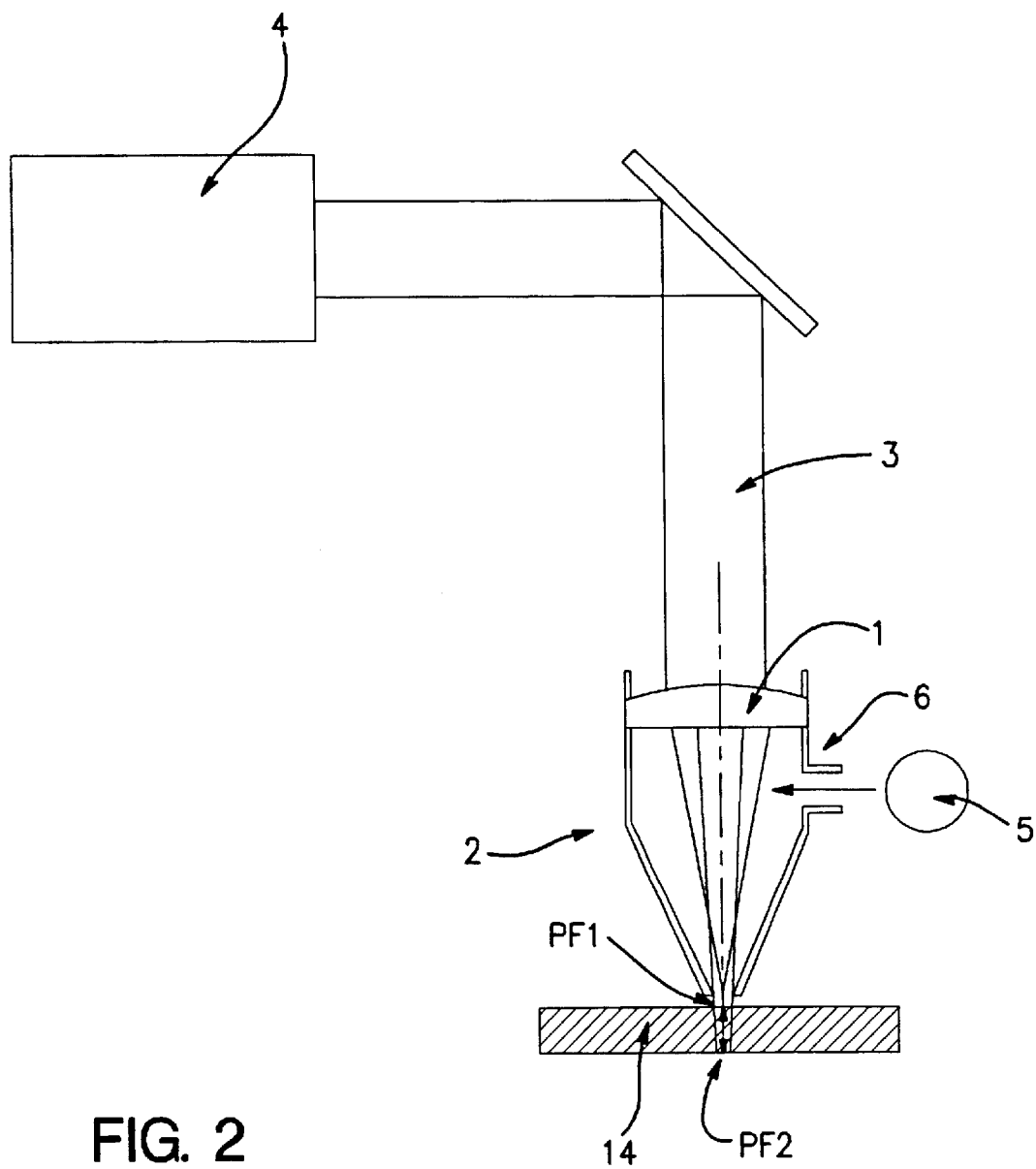
FIG. 2 depicts an apparatus for cutting an alloy or non-alloy steel workpiece according to the invention.

An apparatus for cutting an alloy or non-alloy steel workpiece according to the invention is shown schematically in FIG. 2.

This apparatus comprises at least one laser generator 4 for generating at least one laser beam, at least one output nozzle 2 through which said laser beam 3 passes, at least one transparent or reflecting optical means 1 for focusing said laser beam 3 and at least one source 5 of assist gas for said laser beam 3 feeding said output nozzle 2 with assist gas, the assist gas being introduced into the nozzle 2 via one or more gas inlet orifices 6 penetrating via the peripheral wall of the nozzle 2.

According to the invention, the optical means 1 is of the multifocus type, preferably a multifocus lens, and the source 5 of assist gas feeds the nozzle 2 with nitrogen or with a nitrogen/oxygen mixture.

Preferably, the laser is of the $CO_2$ type, but in certain cases it may be of the YAG type.

Transparent or reflecting optical components 1 having several focusing points that can be used within the context of the present invention are described in document WO-A-98/14302 or in documents DE-A-2713904, DE-A-4034745, JP-A-01048692 or JP-A-56122690.

As shown in detail in FIG. 1, the first focusing point PF1 arising from the widest convergence angle, in this case the angle α, lies near the upper surface of the workpiece 14 to be cut, preferably so as to coincide with said upper surface, or in the thickness of the material in a region close to said upper surface.

The second focusing point PF2 arising from the smallest convergence angle, in this case the angle β, lies near the lower surface of the workpiece 14 in the thickness of the material or beyond the latter.

This principle makes it possible, compared with the use of a standard optical component employed in cutting steel under nitrogen, to use smaller nozzle diameters and therefore to reduce the consumption of gas.

This is because the use of a standard optical component, i.e. one having only a single focusing point, implies positioning its single focusing point, and therefore that for which the convergence angle is the greatest, at the lower face of the material, or indeed below it.

Consequently, in order to allow passage of the laser beam, it is necessary to use large-diameter nozzles, typically at least 2 mm in diameter, this being greater the thicker the workpiece, and this therefore correspondingly increases the gas consumption.

On the other hand, according to the present invention, by combining a bifocal optical component 1, that is to say a component having at least two focusing points PF1 and PF2 which are separate from one another, with nitrogen or a nitrogen/oxygen mixture, on the one hand, the gas consumption is decreased as mentioned above and, on the other hand, the presence of an oxide on the cut faces is eliminated or greatly reduced, particularly in the case of the cutting of structural steels or mild steels.

In other words, the method of the invention makes it possible to increase the cutting performance and to limit the consumption of cutting gas while obtaining a favorable economic balance with respect to oxygen by including the saving on finishing.

When it is desired to obtain an almost oxide-free cut, it is necessary to use gaseous nitrogen whose oxygen content does not exceed 150 ppm by volume.

However, if the complete or almost complete elimination of oxides is not imperative or not desired, that is to say it is sufficient to limit the presence of these oxides on the cut faces, a nitrogen/oxygen mixture whose oxygen content is preferably less than or equal to 5% by volume is perfectly suitable.

A nitrogen/oxygen mixture that can be used within the context of the invention may be obtained, for example, directly on the site of use from atmospheric air treated by a membrane system so as to reduce its oxygen content down to the desired value.

A membrane system of this type is sold by L'Air Liquide under the name FLOXAL™.

However, the nitrogen/oxygen mixture may also be obtained more conventionally by mixing nitrogen and oxygen in the desired proportions.

The laser cutting method of the invention results in high cutting rates, i.e. from about 0.9 m/min to about 5.9 m/min depending on the thicknesses, combined with reduced cutting gas flow rates, typically no more than 19 $m^3/h$, and in the production of low-cost cut workpieces, particularly for a laser source of 1 800 W in power, for example.

What is claimed is:

1. A method of cutting a workpiece made of alloy or non-alloy steel by the use of at least one transparent or reflecting optical means for focusing at least one laser beam and of at least one assist gas for said laser beam, wherein the optical means comprise a multifocus optical element, and the assist gas is nitrogen or a nitrogen/oxygen mixture containing at least 90% nitrogen and an oxygen content greater than 0% by volume and less than 8% by volume.

2. The method according to claim 1, wherein the optical means is chosen from lenses, mirrors and combinations thereof.

3. The method according to claim 1, wherein the optical means is a bifocal lens.

4. The method according to claim 1, wherein the assist gas is nitrogen containing less than 150 ppm by volume of oxygen as an impurity.

5. The method according to claim 4, wherein the nitrogen contains less than 100 ppm by volume of oxygen as an impurity.

6. The method according to claim 1, wherein the oxygen content is between 150 ppm and 5% by volume.

7. The method according to claim 1, wherein the optical means are arranged so as to obtain at least one first focusing point positioned near the upper surface of the workpiece to be cut, or in the thickness of the workpiece to be cut in a region close to the upper surface, and at least one second focusing point positioned near the lower surface of the workpiece to be cut and in the thickness of the workpiece, or beyond the workpiece.

8. The method according to claim 1, wherein the workpiece to be cut has a thickness between 1.5 mm and 5 mm.

9. The method according to claim 1, wherein the workpiece to be cut is chosen from plates, sheets and tubes.

10. The method according to claim 1, wherein the nitrogen/oxygen mixture is obtained directly on a site of use from atmospheric air treated by a membrane system.

11. A method for cutting a workpiece, which comprises:
   providing a workpiece having an upper surface and a lower surface, said workpiece being made of alloy or non-alloy steel;
   generating at least one laser beam;
   passing said laser beam through an output nozzle;
   feeding said output nozzle with an assist gas comprising nitrogen or a nitrogen/oxygen mixture containing at least 90% nitrogen and an oxygen content greater than 0% by volume and less than 8% by volume; and focusing said laser beam through at least one transparent or reflecting multifocus optical element so as to obtain a first focusing near the upper surface, and a second focusing near the lower surface of the workpiece.

12. An apparatus for cutting a workpiece made of alloy or non-alloy steel, comprising:

at least one laser generator for generating at least one laser beam;

at least one output nozzle through which said laser beam passes;

at least one transparent or reflecting optical means for focusing said laser beam; and at least one source of assist gas for said laser bean feeding said output nozzle with assist gas;

wherein;

the optical means comprise a multifocus optical element; and the source of assist gas feeds the nozzle with nitrogen or with a nitrogen/oxygen mixture containing at least 90% nitrogen and an oxygen content greater than 0% by volume and less than 8% by volume.

* * * * *